United States Patent
Mattern et al.

(10) Patent No.: US 11,636,719 B2
(45) Date of Patent: *Apr. 25, 2023

(54) DIAGNOSTIC DATA VISUALIZATION METHODS

(71) Applicant: Cummins Inc., Columbus, IN (US)

(72) Inventors: Michael F. Mattern, Columbus, IN (US); Lathika Amin, Glenview, IL (US); James C. Dager, Columbus, IN (US); Austin Davis, Columbus, IN (US); Gorance V. Eftimovski, Columbus, IN (US); Ramsundar Muthusubramanian, Columbus, IN (US); Paula Piercecchi Watson, Columbus, IN (US)

(73) Assignee: Cummins Inc., Columbus, IN (US)

( * ) Notice: Subject to any disclaimer, the term of this patent is extended or adjusted under 35 U.S.C. 154(b) by 578 days.

This patent is subject to a terminal disclaimer.

(21) Appl. No.: 16/724,938

(22) Filed: Dec. 23, 2019

(65) Prior Publication Data

US 2020/0126329 A1 Apr. 23, 2020

Related U.S. Application Data

(63) Continuation of application No. 15/373,785, filed on Dec. 9, 2016, now Pat. No. 10,515,492.

(60) Provisional application No. 62/266,425, filed on Dec. 11, 2015.

(51) Int. Cl.
G07C 5/08 (2006.01)
G08G 1/00 (2006.01)
G07C 5/00 (2006.01)
G06Q 10/20 (2023.01)

(52) U.S. Cl.
CPC .......... *G07C 5/0841* (2013.01); *G06Q 10/20* (2013.01); *G08G 1/20* (2013.01); *G07C 5/008* (2013.01)

(58) Field of Classification Search
CPC .... G07C 5/0841; G07C 5/008; G07C 5/0808; G06Q 10/20; G08G 1/20
See application file for complete search history.

(56) References Cited

U.S. PATENT DOCUMENTS

| | | | |
|---|---|---|---|
| 6,301,531 B1 | 10/2001 | Pierro et al. | |
| 7,734,389 B2 | 6/2010 | Shin | |
| 8,275,508 B1 | 9/2012 | Adams et al. | |
| 8,301,332 B2 | 10/2012 | Rawle | |
| 8,416,067 B2 | 4/2013 | Davidson et al. | |

(Continued)

*Primary Examiner* — Robert T Nguyen
(74) *Attorney, Agent, or Firm* — Foley & Lardner LLP

(57) ABSTRACT

A method includes receiving technician data indicative of at least one diagnostic characteristic associated with one or more vehicles, wherein the at least one diagnostic characteristic is representative of a technician servicing event; interpreting the technician data to facilitate remote monitoring of the one or more vehicles; determining a potential root cause for a fault code of a particular vehicle of the one or more vehicles by comparing data of the particular vehicle to the technician data of one or more other vehicles; receiving a display request for a graphical user interface for formatting the graphical user interface in a desired graphical format based on the technician data; and providing the graphical user interface in the desired graphical format to a display device.

20 Claims, 9 Drawing Sheets

(56) References Cited

U.S. PATENT DOCUMENTS

| | | |
|---|---|---|
| 8,620,714 B2 | 12/2013 | Williams et al. |
| 8,881,038 B1 | 11/2014 | Palmer |
| 10,515,492 B2 * | 12/2019 | Mattern .................... G08G 1/20 |
| 10,971,017 B2 * | 4/2021 | Tulpule ................ G05D 1/0291 |
| 2011/0130916 A1 * | 6/2011 | Mayer ...................... B60L 3/12 |
| | | 903/903 |
| 2011/0225096 A1 * | 9/2011 | Cho ....................... G06Q 10/20 |
| | | 705/305 |
| 2012/0136802 A1 * | 5/2012 | McQuade ............ G07C 5/0808 |
| | | 705/347 |
| 2014/0288761 A1 | 9/2014 | Butler et al. |
| 2016/0112216 A1 | 4/2016 | Sargent et al. |
| 2018/0174373 A1 | 6/2018 | Hansen et al. |
| 2019/0164358 A1 | 5/2019 | Hanov et al. |
| 2019/0225233 A1 * | 7/2019 | Tod ........................ G06Q 10/04 |
| 2019/0228322 A1 | 7/2019 | Wenner et al. |
| 2019/0311558 A1 * | 10/2019 | Bika .................... G07C 5/0841 |
| 2020/0394850 A1 * | 12/2020 | Sankavaram .......... G07C 5/008 |

* cited by examiner

DIAGNOSTIC DATA VISUALIZATION METHODS

CROSS-REFERENCE TO RELATED PATENT APPLICATIONS

This application is a Continuation of U.S. patent application Ser. No. 15/373,785, filed Dec. 9, 2016, entitled "DIAGNOSTIC DATA VISUALIZATION METHODS," which claims the benefit of U.S. Provisional Patent Application No. 62/266,425, filed Dec. 11, 2015, entitled "DIAGNOSTIC DATA VISUALIZATION METHODS," both of which are incorporated herein by reference in their entireties.

TECHNICAL FIELD

The present disclosure relates to data visualization methods. More particularly, the present disclosure relates to data visualization methods for monitoring and tracking vehicle operation.

BACKGROUND

Vehicle and engine components may fail during operation of a vehicle and/or engine. With large fleets of vehicles or engine driven systems, the failures may become difficult to monitor. If the components are not repaired or the failures are not diagnosed, progressive damage to the vehicle, engine, and coupled systems may occur. Such damage may be costly to repair and result in lost profits from the damaged vehicles or engines being unable to work (e.g., haul freight, generate power). Accordingly, a need exists for the monitoring and tracking of vehicle and engine operation data for a plurality of vehicles and engines to improve fleet, engine, and individual vehicle performance.

SUMMARY

One embodiment relates to an apparatus. The apparatus includes an aggregation circuit, an analysis circuit, and a data visualization circuit. The aggregation circuit is structured to receive at least one of (i) vehicle data indicative of a least one operating characteristic of one or more vehicles from the one or more vehicles and (ii) technician data indicative of at least one diagnostic characteristic of the one or more vehicles representative of a technician servicing event. The analysis circuit is structured to interpret the at least one of the vehicle data and the technician data to facilitate remote monitoring of the one or more vehicles. The data visualization circuit is structured to receive a display request for providing a graphical user interface to a display device. In one embodiment, the display request includes configurable options for providing the graphical user interface in a desired graphical format including the at least one of the vehicle data and the technician data for the one or more vehicles.

Another embodiment relates to a method. The method includes receiving, by a processor, at least one of (i) vehicle data indicative of a least one operating characteristic of one or more vehicles from the one or more vehicles and (ii) technician data indicative of at least one diagnostic characteristic of the one or more vehicles representative of a technician servicing event; interpreting, by the processor, the at least one of the vehicle data and the technician data to facilitate remote monitoring of the one or more vehicles; receiving, by the processor, a display request for a graphical user interface in a desired graphical format, the display request including configurable options for formatting the graphical user interface in the desired graphical format; and providing, by the processor on a display device, the graphical user interface in the desired graphical format including the at least one of the vehicle data and the technician data for the one or more vehicles.

Another embodiment relates to a system. The system includes a display device and a vehicle management system. The vehicle management system is communicably coupled to at least one of (i) a telematics system operatively coupled to one or more vehicles and (ii) a technician servicing location. The vehicle management system is structured to receive at least one of (i) vehicle data indicative of a least one operating characteristic of the one or more vehicles and (ii) technician data indicative of at least one diagnostic characteristic of the one or more vehicles representative of a technician servicing event for each of the one or more vehicles at the technician servicing location; interpret the at least one of the vehicle data and the technician data to facilitate remote monitoring of the one or more vehicles; and provide a command to the display device to display a graphical user interface in response to receiving a display request. The display request includes configurable options for providing the graphical user interface in a desired graphical format for depicting the at least one of the vehicle data and the technician data for each of the one or more vehicles.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for diagnostic data visualization. The various concepts introduced above and discussed in greater detail below may be implemented in any of numerous ways, as the described concepts are not limited to any particular manner of implementation. Examples of specific implementations and applications are provided primarily for illustrative purposes.

Referring to the figures generally, a system, apparatus, and method are shown for diagnostic data visualization. While generally described herein as "diagnostic" data, this term is used for convenience as the present disclosure contemplates a wide variety of data that may be used with the data visualization systems described herein that those of ordinary skill in the art will readily recognize. In this regard, the diagnostic data visualization provides methods to view and interpret data (e.g., vehicle data, engine data, technician data, etc.) that indicate (e.g., provide insight into, etc.) vehicle and/or engine behavior and usage in the field. Advantageously, the diagnostic visualization methods of the present disclosure allow a user (e.g., a vehicle operator, a fleet manager, a customer, etc.) to proactively address issues that one or more vehicles within a fleet or one or more engines in an engine system may be experiencing, instead of allowing for progressive damage to occur to the vehicle(s) and/or the engine(s). The diagnostic visualization may be provided by a fleet management system (or controller). An example operation of the controller may be as follows. The controller receives vehicle and/or engine data (e.g., from a telematics system, etc.) and/or technician data regarding vehicles within a fleet and/or engines within an engine system (e.g., a power generation system, etc.). The controller interprets the vehicle data, the engine data, and/or the technician data to facilitate remote monitoring of the vehicles and/or engines.

As a more particular example, the controller receives a fault code from one of the vehicles in the fleet and/or engines in the engine system. The controller determines a potential root cause for the fault code and/or a recommended course of action to address the potential root cause. The controller receives a display request for providing a graphical user interface in a desired graphical format from a user. The controller then displays at least one of the vehicle data, the engine data, the technician data, and the recommendation to a display device in the desired graphical format to the user. Advantageously, the user may gain insight into potential root causes for various fault codes based on data from similar vehicles in a fleet and/or engines in an engine system to potentially aid identification and troubleshooting of the fault code.

Figure 1:
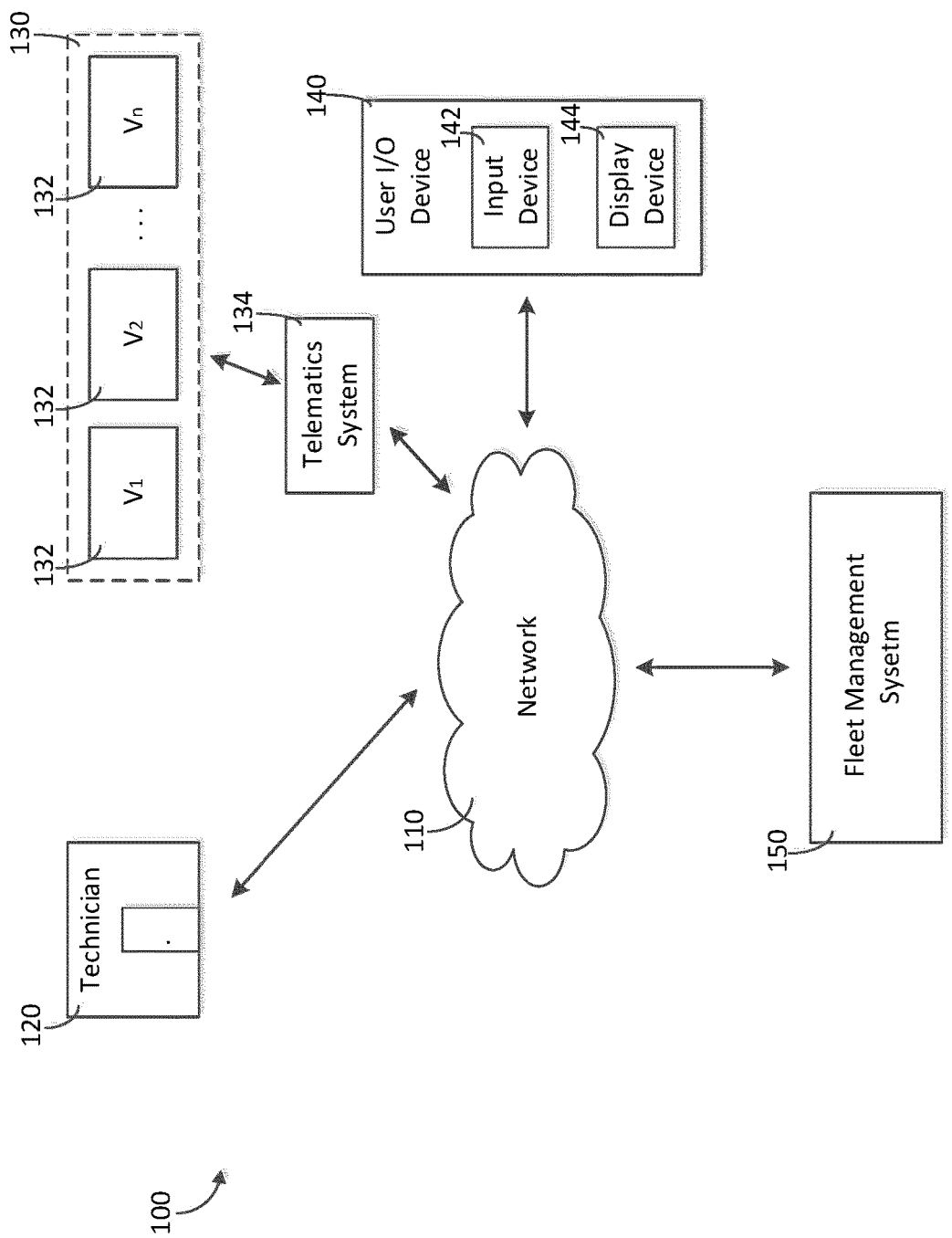
FIG. 1 is a schematic diagram of a data visualization system including a fleet management system coupled to a vehicle servicing location, a plurality of vehicles, and an input/output device over a network, according to an example embodiment.

Referring now to FIG. 1, a schematic diagram of a data visualization system 100 with a plurality of vehicular data input/outputs coupled to a fleet management system is shown according to one embodiment. The data visualization system 100 generally includes a plurality of inputs/outputs, shown as a vehicle servicing location 120, a vehicle fleet 130 coupled to a telematics system 134, and a user input/output (I/O) device 140. The plurality of input/output devices are communicably coupled over a network 110 to a controller, shown as fleet management system 150. In some embodiments, the controller is additionally or alternatively coupled to one or more engine systems, where each engine system may include a plurality of engines (e.g., a power generation system, etc.).

The network 110 may be any type of communication protocol that facilitates the exchange of information between and among the fleet management system 150 and the one or more input/output devices. In this regard, the communication protocol may include any type and number of wired and wireless protocols (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections that provide the exchange of signals, information, and/or data. Further, the network 110 may include a local area network (LAN) or a wide area network (WAN), or the connection may be made to an external computer (for example, through the Internet using an Internet Service Provider).

As shown in FIG. 1, the vehicle fleet 130 includes a plurality of vehicles 132. In one embodiment, the vehicle fleet 130 represent the vehicles 132 owned and/or operated by a user (e.g., a customer, fleet manager, etc.) of the data visualization system 100. A user of the data visualization system 100 may have any number of vehicles 132 in the user's vehicle fleet 130 (e.g., 1, 100, 1000, etc.). In another embodiment, the vehicle fleet 130 represent the vehicles 132 owned and/or operated by a plurality of users of the data visualization system 100 (e.g., a compilation of all vehicles 132 in all vehicles fleets 130 of the data visualization system 100, subscribers to the data visualization system 100, etc.). In an alternative embodiment, a user of the data visualization system 100 may own or operate engine systems (e.g. power generation systems, etc.) in addition to or alternatively to a vehicle fleet 130. In this case, the data visualization system 100 may be tailored for an engine system, rather than a vehicle system, or both. The data visualization system 100 may be structured to segregate data by customer or user (e.g., Customer A may only see data associated with Customer A's fleet and/or engine systems, etc.). The data visualization system 100 may be structured to also segregate data of an individual customer based on access permissions (e.g., a regional manager only has access to data regarding vehicles and/or engine system in his/her region, etc.). The data visualization system 100 may also be structured to allow administrative rights to a user (e.g., a "super-user", etc.) such that the user is able to see all the data for all vehicle fleets 130 and/or engine systems.

The vehicles 132 of the vehicle fleet 130 (or engines of the engine system) may include one or more on-board diagnostic (OBD) tools structured to monitor the vehicles 132 (or engines) (i.e., gather operating characteristics) during operation (e.g., while driving, during power generation, etc.). The OBD tools may gather vehicle data and/or engine data to be transmitted to the fleet management system 150 over the network 110 via the telematics system 134. The telematics system 134 is structured to facilitate the transfer of vehicle data from the vehicles 132 (or engine data from the engine) to the fleet management system 150 over the network 110. The vehicle data may be indicative of a least one operating characteristic of the vehicle(s) 132 and/or one or more components of the vehicle(s) 132. The engine data may be indicative of a least one operating characteristic of the engine(s) and/or one or more components of the engine(s). The operating characteristics may include, but are not limited to, a temperature (e.g., of an engine, a coolant system, oil, etc.), an exhaust emission characteristic (e.g., of an engine, an exhaust aftertreatment system, an exhaust gas recirculation (EGR) system, etc.), a speed (e.g., of an engine, the vehicle 132, etc.), an output power/torque, a fault code (e.g., regarding operation of one or more components of the vehicle 132 or engine, etc.), a geographic location, external characteristics (e.g., temperature, humidity, weather, altitude, road grade, etc.), and/or any other operating characteristics of a vehicle, vehicle components, engine, and/or engine components. The one or more components of the vehicle 132 may include, but are not limited to, an engine, a brake system, an exhaust aftertreatment system, an EGR system, a turbocharger, one or more sensors, a fuel system, a coolant system, and an air intake system, among other possible vehicle and/or engine components.

The vehicle servicing location 120 (e.g., an automotive repair shop, etc.) represents one or more locations at which at least one of the vehicles 132 of the vehicle fleet 130 may receive diagnostic service from a mechanic, technician, or the like (e.g., a vehicle/technician servicing event, etc.). During a vehicle servicing event, a diagnostic test may be run on a vehicle 132 to gather various data (e.g., technician data, etc.) regarding the operation of one or more components of the vehicle 132 (e.g., an exhaust aftertreatment system, an engine, a brake system, a turbocharger, an EGR system, etc.). The technician data gathered during the vehicle servicing event may be transmitted to the fleet management system 150 over the network 110. The technician data may include at least one diagnostic characteristic of the one or more components of the vehicle 132. The at least one diagnostic characteristic may indicate that a component is operational or faulty/failed, provide insight to a root cause of a failure, include steps taken (e.g., by a technician, mechanic, etc.) that addressed the failure, and/or include steps taken that did not address the failure.

In some embodiments, diagnostic service may be performed on-site by a mechanic, technician, or the like (e.g., an engine/technician servicing event, for a vehicle, for an engine system, etc.). During an on-site servicing event, a diagnostic test may be run on a vehicle 132 and/or an engine system (e.g., a power generation system, etc.) to gather various data (e.g., technician data, etc.) regarding the operation of one or more components of the vehicle 132 and/or the engine system. The technician data may be acquired by a portable device (e.g., a tablet, a laptop, a smartphone, via an electronic service/diagnostic tool, etc.) during the vehicle and/or engine system servicing event and transmitted to the fleet management system 150 over the network 110. The technician data may include at least one diagnostic characteristic of the one or more components of the vehicle 132 and/or the engine system. The at least one diagnostic characteristic may indicate that a component is operational or faulty/failed, provide insight to a root cause of a failure, include steps taken (e.g., by a technician, mechanic, etc.) that addressed the failure, and/or include steps taken that did not address the failure.

The user I/O device 140 enables a user of the data visualization system 100 to communicate with the data visualization system 100, and more specifically the fleet management system 150. As shown in FIG. 1, the user I/O device 140 includes an input device 142 and a display device 144. The input device 142 may include, but is not limited to, a keyboard, a mouse, a touchscreen device, one or more buttons and switches, voice command receivers, etc. The display device 144 is structured to provide a graphical user interface (GUI) to the user of the data visualization system 100. The display device 144 may include, but is not limited to, a touchscreen display, a projector and projection screen, a monitor or television (e.g., a LCD, LED, CRT, plasma, DLP, etc.), augmented reality glasses, a portable device (e.g., a smartphone, tablet, laptop, etc.), and/or any other known display devices that can provide a GUI.

According to an example embodiment, input device 142 enables a user to provide an input to the data visualization system 100. The input may include a display request including various configurable options for providing the GUI in a desired graphical format. The desired graphical format may present the vehicle data, the engine data, the technician data, and/or other features (e.g., a recommendation on how to address a potential root cause of a fault code, etc.), which are described more fully herein.

Figure 2:
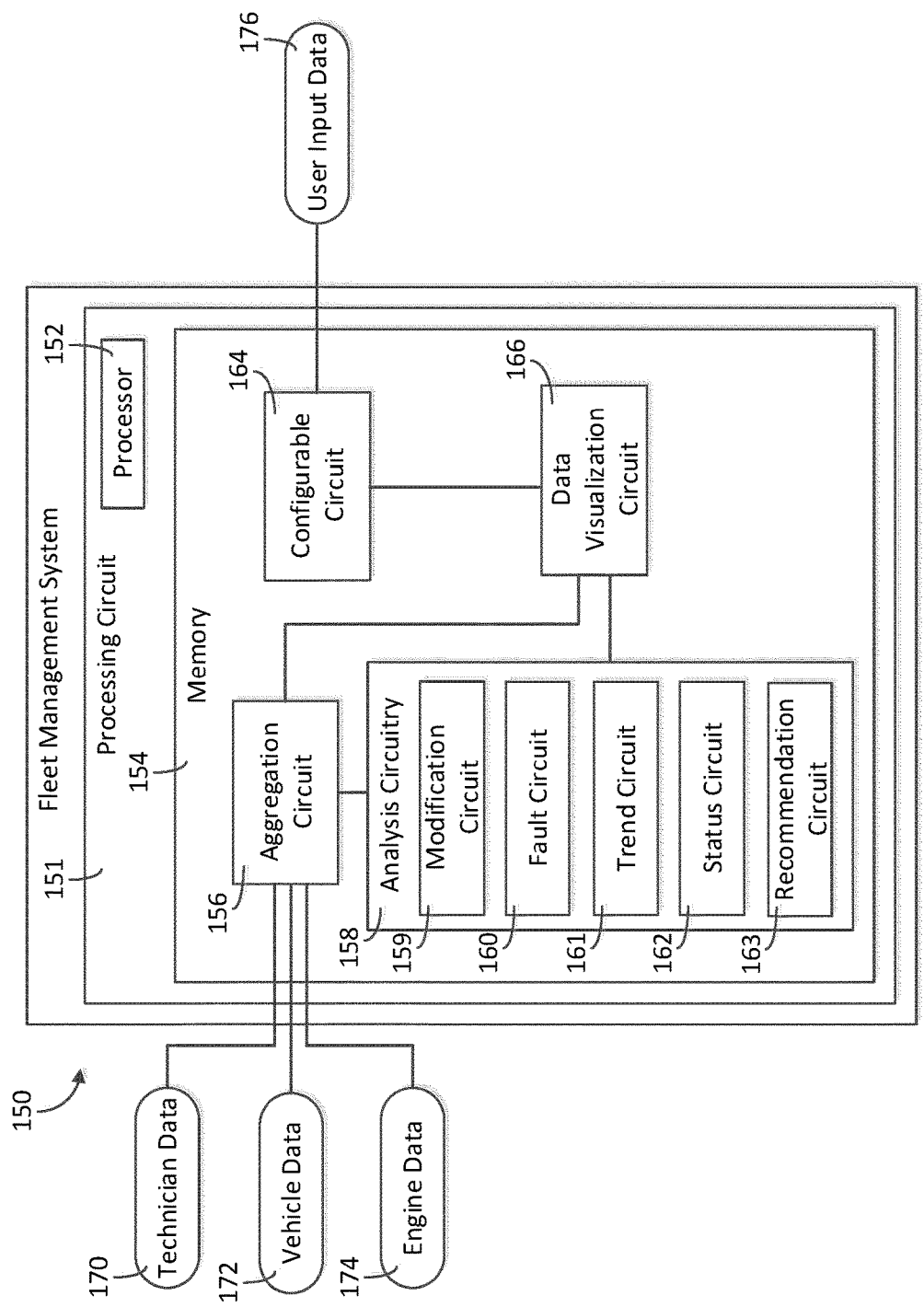
FIG. 2 is a schematic diagram of the fleet management system used with the data visualization system of FIG. 1, according to an example embodiment.

Referring now to FIG. 2, a structure and function of the fleet management system 150 are shown according to an example embodiment. The fleet management system 150 may also be referred to as a controller herein and is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., NVRAM, RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the fleet management system 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various circuits for completing the activities described herein. More particularly, the memory 154 includes an aggregation circuit 156, an analysis circuitry 158, a configurable circuit 164, and a data visualization circuit 166. The circuits 156-166 may be structured to provide various data and/or information (e.g., vehicle data, engine data, technician data, a recommended course of action to address a fault code, etc.) to a user via a GUI that is formatted based on user selected options. While various circuits with particular functionality are shown in FIG. 2, it should be understood that the fleet management system 150 and memory 154 may include any number of circuits for completing the functions described herein. For example, the activities of multiple circuits may be combined as a single circuit, as additional circuits with additional functionality may be included, etc. Further, it should be understood that the fleet management system 150 may further control other activity beyond the scope of the present disclosure.

Certain operations of the fleet management system 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The aggregation circuit 156 may be communicably coupled to the one or more vehicles 132 (e.g., via the telematics system 134, etc.), engines and/or engine systems, and/or the vehicle serving location(s) 120 over the network 110. As shown in FIG. 2, the aggregation circuit 156 is structured to receive technician data 170. The technician data 170 may be indicative of at least one diagnostic characteristic of one or more vehicles 132 from a vehicle servicing event (e.g., at a vehicle servicing location 120, etc.) or one or more engine systems from an engine system servicing event. The aggregation circuit 156 is also structured to receive vehicle data 172 indicative of a least one operating characteristic of the one or more vehicles 132 (e.g., from OBD tools of the vehicles 132, etc.). In some embodiments, the aggregation circuit 156 is also structured to receive engine data 174 indicative of a least one operating characteristic of the one or more engines and/or engine systems. In some embodiments, the aggregation circuit 156 provides the technician data 170, the engine data 174, and/or the vehicle data 172 to the data visualization circuit 166 for display via the display device 144. In other embodiments, the aggregation circuit 156 provides at least a portion of the technician data 170, the engine data 174, and/or the vehicle data 172 to the analysis circuitry 158 for further processing.

According to one embodiment, the aggregation circuit 156 may include communication circuitry structured to facilitate the exchange of information, data, values, non-transient signals, etc. between and among the aggregation circuit 156, the analysis circuitry 158, the data visualization circuit 166, the telematics system 134 (e.g., the one or more vehicles 132, the one or more engine systems, etc.) and/or the vehicle servicing location(s) 120. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the aggregation circuit 156 may include communication circuitry including, but not limited to, wired and wireless communication protocol to facilitate reception of the vehicle data 172, the engine data 174, and/or the technician data 170. In another embodiment, the aggregation circuit 156 may include machine-readable media stored by the memory 154 and executable by the processor 152, wherein the machine-readable media facilitates performance of certain operations to receive the vehicle data 172, the engine data 174, and/or the technician data 170. For example, the machine-readable media may provide an instruction (e.g., command, etc.) to the network 110 operatively coupled to the vehicle servicing location(s) 120, the vehicles 132, and/or the engine systems to monitor and acquire the vehicle data 172, the engine data 174, and/or the technician data 170. In this regard, the machine-readable media may include programmable logic that defines the frequency of acquisition of the vehicle data 172, the engine data 174, and/or the technician data 170. In yet another embodiment, the aggregation circuit 156 may include any combination of machine-readable content and communication circuitry.

The analysis circuitry 158 is structured to receive and interpret the technician data 170, the engine data 174, and/or the vehicle data 172 from the aggregation circuit 156 to facilitate remote monitoring of the one or more vehicles 132. According to one embodiment, the analysis circuitry 158 may include communication circuitry structured to facilitate the exchange of information, data, values, non-transient signals, etc. between and among the analysis circuitry 158, the aggregation circuit 156, and/or the data visualization circuit 166. For example, the communication circuitry may include a channel comprising any type of communication channel (e.g., fiber optics, wired, wireless, etc.), wherein the channel may include any additional component for signal enhancement, modulation, demodulation, filtering, and the like. In this regard, the analysis circuitry 158 may include communication circuitry including, but not limited to, wired and wireless communication protocol to facilitate reception of the vehicle data 172, the engine data 174, and/or the technician data 170. In another embodiment, the analysis circuit 158 may include machine-readable media stored by the memory 154 and executable by the processor 152, wherein the machine-readable media facilitates performance of certain operations to receive and analyze the vehicle data 172, the engine data 174, and/or the technician data 170. For example, the machine-readable media may provide an instruction (e.g., command, etc.) to the aggregation circuit 156 to acquire the vehicle data 172, the engine data 174, and/or the technician data 170. In this regard, the machine-readable media may include programmable logic that defines the frequency of analysis of the vehicle data 172, the engine data 174, and/or the technician data 170. In yet another embodiment, the analysis circuitry 158 may include any combination of machine-readable content and communication circuitry.

As shown in FIG. 2, the analysis circuitry 158 includes a modification circuit 159, a fault circuit 160, a trend circuit 161, a status circuit 162, and a recommendation circuit 163. The modification circuit 159 is structured to modify at least one of the vehicle data 172, the engine data 174, and the technician data 170 received for each of the one or more vehicles 132 with a unique modifier. In one embodiment, the unique modifiers are predefined within the memory 154 of the fleet management system 150. In an alternative embodiment, the unique modifiers may be defined by the user of the data visualization system 100 using the input device 142. The unique modifier may be based on the type of vehicle (e.g., truck, sedan, coupe, etc.), type of engine (e.g., 10 cylinder, 8 cylinder, 6 cylinder, 4 cylinder, etc.), and/or any other type of component of the vehicles 132 and/or engine system. The unique modifier(s) may be used by the modification circuit 159 to "decorate" the raw vehicle data 172, engine data 174, and technician data 170 received from the aggregation circuit 156. The "decorated" vehicle data 172, engine data 174, and technician data 170 may provide the other circuits of the analysis circuitry 158 with data that includes unique knowledge of the vehicles 132, the components of the vehicles 132, the engine system(s), and/or the components of the engine system(s) that allows for a more detailed analysis of the operation of the vehicles 132 and/or engine systems. For example, decorating (e.g., enriching, enhancing, etc.) the data may include incorporating details such as vehicle make, vehicle model, engine size, engine model, engine date of manufacture, and the like. The raw vehicle data 172 or the raw engine data 174 may include a fault code that one of the vehicles 132 or engine systems, respectively, is experiencing. The modification circuit 159 may interpret the fault code (e.g., using a look-up table, etc.) to determine what components of the vehicle 132 or the engine system may be affected by or cause the fault code.

The fault circuit 160 is structured to interpret the technician data 170, the engine data 174, and/or the vehicle data 172 to extract the various fault codes the vehicles 132 within the vehicle fleet 130 and/or the engines and engine components within the engine system(s) are experiencing. The fault circuit 160 is further structured to interpret the various fault codes such that the fault codes may be categorized. For example, all of the fault codes associated with fueling systems may be aggregated into a fueling category, all of the fault codes associated with engines may be aggregated into an engine category, and so on. In another example, the fault codes may be categorized by priority such that the relatively high priority fault codes are aggregated into a high priority category, and the lower priority fault codes are aggregated into a lower priority category.

The trend circuit 161 is structured to analyze how different parameters (e.g., vehicle operating characteristics, engine operating characteristics, external characteristics, etc.) factor into the vehicle data 172 and the various fault codes of the one or more vehicles 132 and/or the engine data 174 and the various fault codes of the one or more engine systems. In one embodiment, the trend circuit 161 is structured to compare the vehicle data 172, the engine data 174, and/or technician data 170 between the one or more of the vehicles 132 and/or engine systems. For example, the trend circuit 161 may compare the technician data 170 and/or the vehicle data 172 of a first vehicle 132, an individual component of the first vehicle 132, a plurality of components of the first vehicle 132, a first population of vehicles 132, or a first vehicle fleet 130 to the technician data 170 and/or the vehicle data 172 of a second vehicle 132, an individual component of the second vehicle 132, a plurality of components of the second vehicle 132, a second population of vehicles 132, or a second vehicle fleet 130, or any combination thereof. In some embodiments, the trend circuit 161 compares a different number of components, vehicles, and/or populations of vehicles (e.g., three, four, etc.). In other embodiments, the trend circuit 161 is structured to facilitate predicting a potential failure of a component based on the trends (e.g., the trends for one component of a vehicle are substantially similar to the trends of a failed component of another vehicle before failure occurred, etc.).

In another example, the trend circuit 161 may compare the technician data 170 and/or the engine data 174 of a first engine system, a first engine, an individual component of the first engine system, a plurality of components of the first engine system, a first population of engines, or a first population of engine systems to the technician data 170 and/or the engine data 174 of a second engine system, a second engine, an individual component of the second engine system, a plurality of components of the second engine system, a second population of engines, or a second population of engine systems, or any combination thereof. In some embodiments, the trend circuit 161 compares a different number of components, engines, and/or engine systems (e.g., three, four, etc.). In other embodiments, the trend circuit 161 is structured to facilitate predicting a potential failure of a component based on the trends (e.g., the trends for one component of an engine system are substantially similar to the trends of a failed component of another engine system before failure occurred, etc.).

The comparison between vehicle data 172, the engine data 174, and/or the technician data 170 may facilitate determining a root cause or potential root cause for a fault code of one or more of the vehicles 132 and/or engine systems. For example, a first vehicle that was experiencing a particular fault code may be serviced (e.g., at a vehicle servicing location 120, etc.) where diagnostics testing was run to determine a root cause of the fault code. A second vehicle may experience the same or a similar fault code. By comparing the technician data 170 and/or the vehicle data 172 of the first vehicle (or the engine data 174 of a first engine system) to the vehicle data 172 of the second vehicle (or the engine data 174 of a second engine system), the trend circuit 161 may be able to facilitate determining whether the fault code of the second vehicle (or the second engine system) may be caused by the same root cause as the first vehicle (or first engine system). In another example, a vehicle may experience a particular fault code while driving in a certain geographic location (e.g., desert, mountains, etc.), experiencing certain vehicle operating conditions (e.g., engine speed, transmission gear, engine temperature, etc.), and/or encountering certain external conditions (e.g., temperature, altitude, weather, road grade, etc.). The geographic location, vehicle operating conditions, and/or external conditions may be compared to the geographic location, vehicle operating conditions, and/or external conditions of other vehicles (e.g., with a diagnosed root cause of a failure, etc.) where they experienced a similar fault code. Similarities in at least one of geographic location, vehicle operating conditions, and external conditions may provide an indication to the potential root cause of fault code of the vehicle. In another embodiment, the trend circuit 161 is structured to analyze trends of the vehicle data 172, the engine data 174, and/or technician data 170 of a single vehicle 132 or a single engine system to determine whether the trends indicate a root cause of a fault code. For example, a component of a vehicle or engine system may operate within a certain range during normal operation of the vehicle or the engine system. A sensor may then read that the component is operating outside of that range when a fault code is thrown. Therefore, the vehicle data 172 or the engine data 174 may indicate that the vehicle component or engine system component is operating outside of the normal operating conditions may be the reason for the fault code or that other components coupled (e.g., fluidly coupled, mechanically coupled, electrically coupled, etc.) to the component may be the reason for the fault code.

The status circuit 162 is structured to monitor the vehicle(s) 132 of the vehicle fleet 130 and/or the engine system(s). According to one embodiment, the status circuit 162 monitors the status of the vehicle(s) 132 based on geographic location. In one embodiment, the status circuit 162 monitors the trip progress of a vehicle 132 along a planned route. In some embodiments, the status circuit 162 monitors the health status of the vehicle(s) 132 or the engine system(s). For example, the status circuit 162 may keep track of the vehicle(s) 132 and/or engine system(s) that are experiencing a fault code, operating according to standard operating conditions, operating at a derated torque output or speed (e.g., due to emission issues, to prevent progressive damage, etc.), shutdown (e.g., turned off, not currently running, etc.), experiencing downtime due to a fault code or other factor, and the like. The status circuit 162 may also monitor the geographic location at which a fault code initially occurred.

The fault circuit 160 may be further structured to correlate various trends (e.g., determined by the trend circuit 161, etc.) and statuses (e.g., determined by the status circuit 162, etc.) with the fault codes which may be interpreted by the recommendation circuit 163 to determine a recommended course of action to address a potential root cause for the fault codes. As such, the recommendation circuit 163 may receive the fault code information, the trend information, and the status information from the fault circuit 160, the trend circuit 161, and the status circuit 162, respectively.

The recommendation circuit 163 is structured to determine the recommended course of action to address the potential root cause of the fault code based on the comparison of the trends of the vehicle data 172, the engine data 174, and/or technician data 170, the status of the vehicle(s) 132 and/or the engine system(s), and the various faults of the vehicle(s) 132 and/or the engine systems. In one embodiment, the recommendation circuit 163 determines an appropriate course of action to address the potential root cause of the fault code may be to perform maintenance or repair on a specific component or system. In another embodiment, the recommendation circuit 163 determines an appropriate course of action to address the potential root cause of the fault code may be to replace a specific component or components. Thus, the recommendation circuit 163 may substantially prevent the need for performing additional diagnostics tests at a vehicle servicing location 120 or may be used to verify results of a diagnostics test performed at a vehicle servicing location 120. In yet another embodiment, the recommendation circuit 163 determines an appropriate course of action to address the potential root cause of the fault code may be to visit one of the vehicle servicing locations 120 for further diagnostic testing.

In one instance, the recommendation circuit 163 may locate one or more vehicle servicing locations 120 within a specified range of a vehicle 132 experiencing a fault code (e.g., preset within the fleet management system 150, based on the criticality of the fault code, etc.). For example, a certain failure may allow a vehicle to drive a maximum distance of fifty miles. Therefore, the recommendation circuit 163 may find vehicle servicing locations 120 that are within that distance range.

In another instance, the recommendation circuit 163 may locate one or more vehicle servicing locations 120 that are currently carrying a replacement component and/or are capable of fixing the root cause. For example, the component failure may indicate that the component needs to be replaced to continue driving and/or operating the vehicle. Thus, the recommendation circuit 163 may find vehicle servicing locations 120 that have a replacement component in stock to get the vehicle back to normal operation.

In still another instance, the recommendation circuit 163 may locate one or more vehicle servicing locations 120 that have diagnosed similar failures and/or fixed similar failures. This may allow the vehicle to be serviced more quickly and properly since the vehicle servicing location 120 has prior experience with the failure.

The recommendation circuit 163 may further provide recommendations regarding the operation of the vehicle 132 and/or the engine system such as derating the performance or ceasing operation of the vehicle 132 and/or the engine system to prevent further progressive damage (e.g., based on the criticality of the fault code, etc.). In some embodiment, the recommendation circuit 163 determines the recommended course of action based on a comparison between vehicles, engine systems, and/or failures (e.g., performed by the trend circuit 161, etc.). In one instance, the recommendation circuit 163 recommends a certain course of action to address a failure of a vehicle based on a similar failure of another vehicle in the same or similar geographic location (e.g., indicated by the vehicle data 172, etc.). In another instance, the recommendation circuit 163 recommends a certain course of action to address a failure of a vehicle or an engine system based on a similar operating conditions of another vehicle or another engine system when a similar failure occurred (e.g., indicated by the vehicle data 172, the engine data 174, etc.). In yet another instance, the recommendation circuit 163 recommends a certain course of action to address a failure of a vehicle or an engine system based on the performance of the component of the vehicle or the engine system prior to and/or after failure. For example, a component may operate within a designated operating window when healthy and then operate outside that window when failed. In still another instance, the recommendation circuit 163 recommends a certain course of action based on a compilation of technician data 170 regarding a similar failure (e.g., failures that have been determined and fixed by vehicle servicing locations 120, etc.).

The configurable circuit 164 is structured to receive user input data 176 indicative of a display request. The user input data 176 may include configurable options for providing the GUI in a desired graphical format including the at least one of the vehicle data 172, the engine data 174, and the technician data 170 for the one or more vehicles 132 of the vehicle fleet 130 and/or the engine systems. In some embodiments, the configurable circuit 164 may include or be communicably coupled to the input device 142 as a means for controlling which of the configurable options the user may select via the input device 142 (e.g., based on the selected graphical format, etc.). The configurable circuit 164 may provide the display request to the data visualization circuit 166. According to one embodiment, the configurable circuit 164 may include communication circuitry structured to facilitate the exchange of information, data, values, non-transient signals, etc. between and among the configurable circuit 164, the data visualization circuit 166, and/or the input device 142. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the configurable circuit 164 may include communication circuitry including, but not limited to, wired and wireless communication protocol to facilitate reception of the user data 176. In another embodiment, the configurable circuit 164 may include machine-readable media stored by the memory 154 and executable by the processor 152, wherein the machine-readable media facilitates performance of certain operations to receive the user data 176. For example, the machine-readable media may provide an instruction (e.g., command, etc.) to the network 110 operatively coupled to the input device 142 to acquire the user data 176. In this regard, the machine-readable media may include programmable logic that defines the frequency of acquisition of the user data 176. In yet another embodiment, the aggregation circuit 156 may include any combination of machine-readable content and communication circuitry.

According to an example embodiment, the display request includes a selection of the desired graphical format. The desired graphical format may include at least one of a geographic status format (see, e.g., FIG. 6), a failure location format (see, e.g., FIG. 7), a parameter trend format (see, e.g., FIG. 8), and a fault code format (see, e.g., FIG. 9). The configurable options may include the aforementioned graphical formats and various filtering options to filter data displayed in the respective graphical formats. For example, the filtering options may include, but are not limited to, an account of the user (i.e., the respective vehicle fleet 130), an identification number (e.g., a model number, a serial number, a VIN number, etc.), a fault code (e.g., an individual fault code, a fault code category, a fault code priority, etc.), a status (e.g., healthy/normal, derated, shutdown, etc.), a performance parameter selection (e.g., oil pressure, oil temperature, etc.), a time (e.g., date range, time range, etc.), a location (e.g., country, state, region, a predefined route, etc.), and/or a recommended action, among other possibilities.

The data visualization circuit 166 is structured to receive at least one of raw vehicle data 172, engine data 174, and/or technician data 170, decorated/modified vehicle data 172, engine data 174, and/or technician data 170, and the display request and filtering options for the desired graphical format of the data. In some embodiments, the data visualization circuit 166 may include or be communicably coupled to the display device 144 as a means for controlling the display device 144. As such, the data visualization circuit 166 is further structured to provide a graphical user interface including the vehicle data 172, the engine data 174, and/or the technician data 170 to the display device 144 in a visual/graphical format based on the display request and filtering options. The data visualization circuit 166 may facilitate the display of the raw data, the decorated/modified data, or a combination thereof. The data visualization circuit 166 may further control which of the filtering options are displayed on the display device 144 for the user to select via the input device 142 (e.g., based on a selected graphical format, etc.). According to one embodiment, the data visualization circuit 166 may include communication circuitry structured to facilitate the exchange of information, data, values, non-transient signals, etc. between and among the data visualization circuit 166, the aggregation circuit 156, the analysis circuitry 158, the configurable circuit 164, and/or the display device 144. For example, the communication circuitry may include a channel comprising any type of communication channel (e.g., fiber optics, wired, wireless, etc.), wherein the channel may include any additional component for signal enhancement, modulation, demodulation, filtering, and the like.

In this regard, the data visualization circuit 166 may include communication circuitry including, but not limited to, wired and wireless communication protocol to facilitate reception of the vehicle data 172, the engine data 174, the technician data 170, and/or the user input data 176. In another embodiment, the data visualization circuit 166 may include machine-readable media stored by the memory 154 and executable by the processor 152, wherein the machine-readable media facilitates performance of certain operations to receive and/or display the vehicle data 172, the engine data 174, the technician data 170, and/or the desired GUI (e.g., based on the user input data 176, etc.). For example, the machine-readable media may provide an instruction (e.g., command, etc.) to the network 110 operatively coupled to the display device 144 to display the vehicle data 172, the engine data 174, and/or the technician data 170 with a desired GUI. In this regard, the machine-readable media may include programmable logic that defines the frequency of acquisition and display of the vehicle data 172, the engine data 174, the technician data 170, and/or the user data 176. In yet another embodiment, the aggregation circuit 156 may include any combination of machine-readable content and communication circuitry.

The display of the vehicle data 172, the engine data 174, and/or the technician data 170 may facilitate proactive repair of the one or more vehicles 132 or the one or more engine systems. For example, a user may interpret the determinations made by the analysis circuitry 158 (e.g., the fault circuit 160, the trend circuit 161, the status circuit 162, etc.), such as fault categories/priorities, trends in the data, and status of the vehicle components and vehicles 132 within the vehicle fleet 130 and/or engines and engine systems, to take certain action (e.g., repair, preventative maintenance, etc.). In some embodiments, the data visualization circuit 166 is further structured to provide at least one of the potential root cause for a fault code and the recommended course of action to address the potential root cause of the fault code (e.g., determined by the recommendation circuit 163, etc.) to the display device 144 to further facilitate proactive repair of the one or more vehicles 132 and/or the one or more engine systems.

Figure 3:
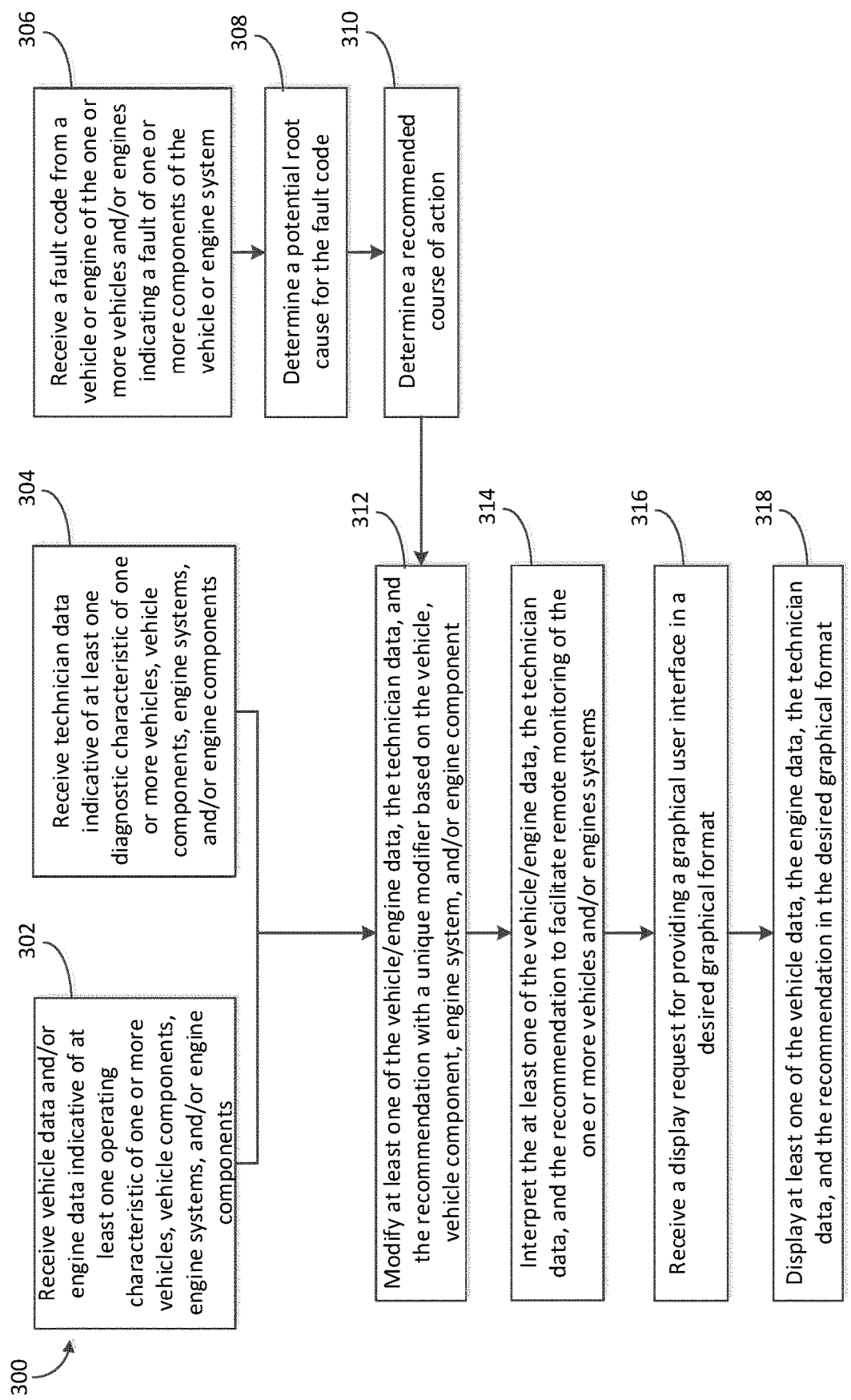
FIG. 3 is a flow diagram of a method of providing data visualization in various graphical formats, according to an example embodiment.

Referring now to FIG. 3, a method 300 of providing data visualization in various graphical formats is shown according to an example embodiment. Method 300 may be implemented with the data visualization system 100 of FIG. 1 and the fleet management system 150 of FIG. 2. Accordingly, method 300 is described with regards to FIGS. 1-2.

At process 302, the fleet management system 150 receives vehicle data (e.g., the vehicle data 172, etc.) and/or engine data (e.g., the engine data 174, etc.). The vehicle data may be indicative of at least one operating characteristic of one or more vehicles and/or vehicle components (e.g., the vehicle(s) 132 within the vehicle fleet 130, etc.). The vehicle data may be provided by on-board diagnostic tools of the one or more vehicles. The fleet management system 150 may receive the vehicle data from a single vehicle or a plurality of vehicles. The engine data may be indicative of at least one operating characteristic of one or more engine systems (e.g., a power generation system, etc.) and/or engine components. At process 304, the fleet management system 150 receives technician data (e.g., the technician data 170, etc.). The technician data may be indicative of at least one operating characteristic of the one or more vehicles, vehicle components, engine systems, and/or engine system components. The technician data may be provided from a technician servicing location (e.g., the vehicle servicing location 120, etc.) following a vehicle servicing event (e.g., a diagnostic test, maintenance, repair, etc.) being performed on a vehicle. The technician data may be acquired during an on-site servicing and/or diagnostic event. In some embodiments, one of process 302 and process 304 may be omitted.

Processes 306-310 may be omitted in some embodiments, or performed in response to a user request. At process 306, the fleet management system 150 receives a fault code from a vehicle of the one or more vehicles or an engine system indicating a fault of one or more components of the vehicle or engine system, respectively. In response to the fault code, the fleet management system 150 may compare the vehicle data of the vehicle to at least one of the vehicle data and the technician data of the one or more vehicles or compare the engine data of the engine system to at least one of the engine data and the technician data of the one or more engine systems. As described above, various trends in the data and statuses may be identified (e.g., failure of a component around an approximate mileage, in response to environmental effects such as temperature, grade, or altitude, etc.). The trends in the data may be used by the fleet management system 150 to determine a potential root cause for the fault code of the vehicle or engine system based on the data comparison (process 308) (e.g., by comparing the vehicle data and the technician data of the one or more vehicles, by comparing the engine data and the technician data of the one or more engine systems, etc.). At process 310, the fleet management system 150 is structured to determine a recommended course of action to address the potential root cause of the fault code. The recommendation may be based on the comparison of the vehicle data of the respective vehicle experiencing a failure to the at least one of the vehicle data and the technician data of the one or more vehicles. The recommendation may be based on the comparison of the engine data of the respective engine system experiencing a failure to the at least one of the engine data and the technician data of the one or more engine systems.

At process 312, the fleet management system 150 is structured to modify (e.g., enhance, enrich, decorate, etc.) at least a portion of at least one of the vehicle data, the engine data, the technician data, and/or the recommendation for each vehicle, vehicle component, engine system, and/or engine component with a unique modifier. The unique modifier may be based on the respective vehicle, vehicle component, engine system, and/or engine component the data was taken from. At process 314, the fleet management system 150 interprets at least one of the vehicle data, the engine data, and the technician data to facilitate remote monitoring of the one or more vehicles and/or the one or more engine systems.

At process 316, the fleet management system 150 receives a display request from an input device (e.g., the input device 142, etc.) to provide a GUI to a display device (e.g., the display device 144, etc.) in a desired graphical format. The desired graphical format may be selected by the user of the data visualization system 100 via the input device. At process 318, the fleet management system 150 provides a command to the display device to display at least one of the vehicle data, the engine data, the technician data, and the recommendation to address the potential root cause of the fault code of the vehicle and/or engine system in the selected graphical format. The user may further provide various configurable options to the fleet management system 150 to reconfigure the selected graphical format. For example, the configurable options may include various filtering options to sort, filter, or otherwise alter the display of the vehicle data and/or technician data.

Figure 4:
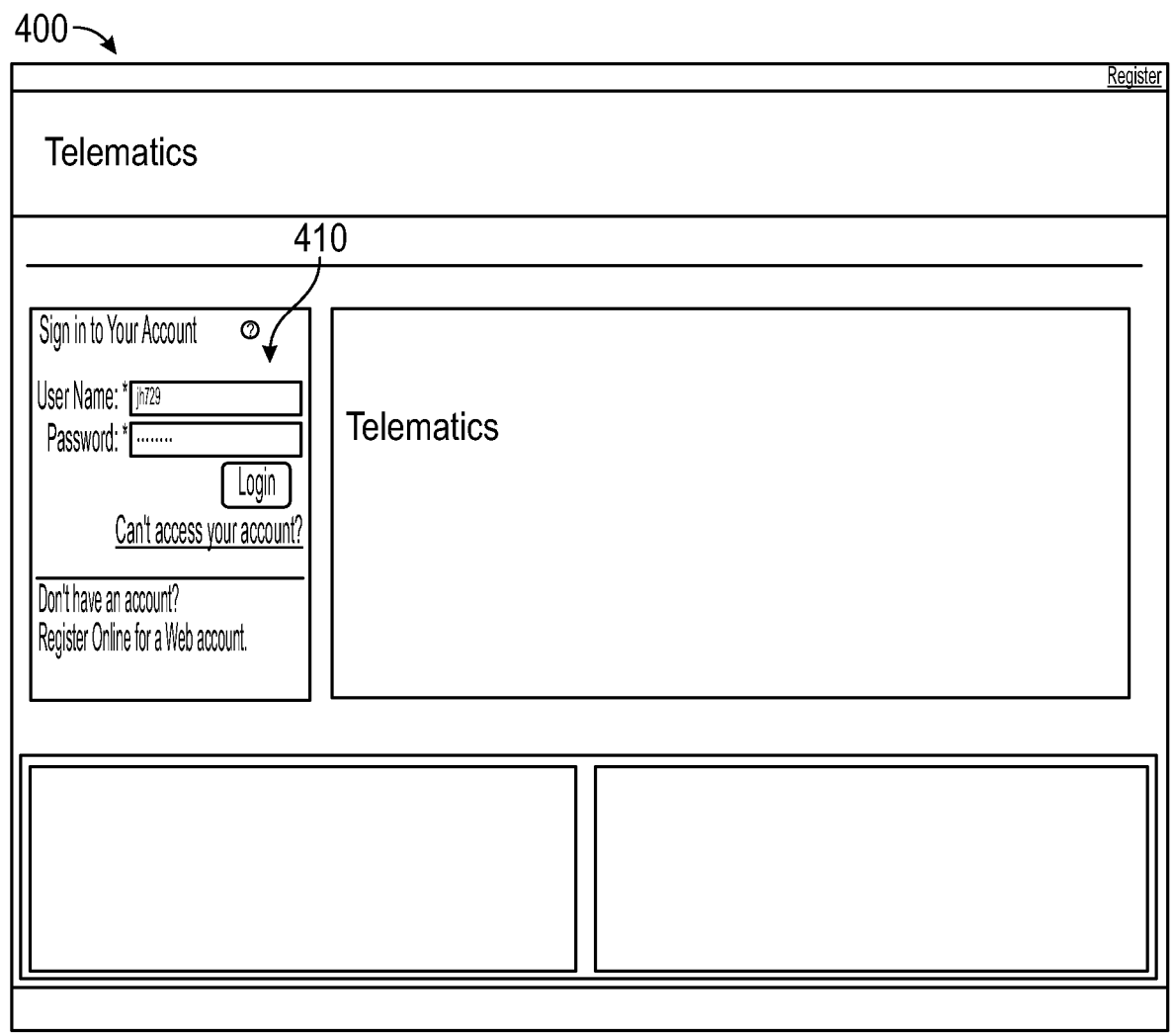
FIG. 4 is an illustration of a graphical user interface depicting a login interface, according to an example embodiment.
Figure 5:
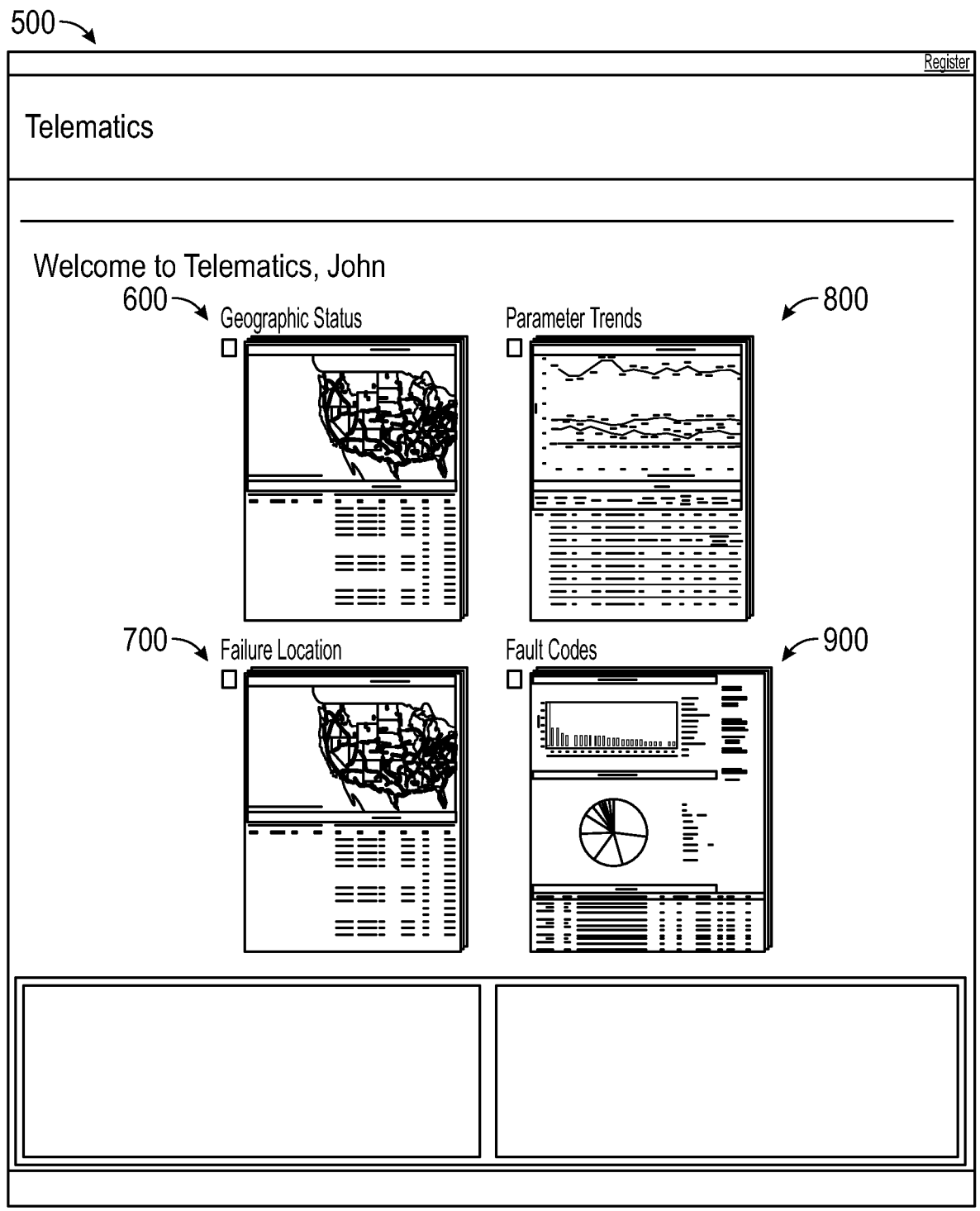
FIG. 5 is an illustration of a graphical user interface for providing various available graphical formats for data visualization, according to an example embodiment.

Referring now to FIGS. 4-9, the various graphical formats of the GUI provided by the data visualization system 100 are shown according to one embodiment. The data visualization system 100 may be accessed by a user on a website (e.g., an URL, etc.), an application (e.g., a portable device application such as a smart phone or tablet application, etc.), or any other platform that facilitates remote access to the data visualization system 100 (i.e., via the network 110). The data visualization system 100 is structured to provide a user with a login interface 400 when a user accesses the data visualization system 100. As shown in FIG. 4, the login interface 400 provides the user with a fillable form 410 where the user provides login credentials (e.g., username, account number, email, password, etc.). With a successful login, the data visualization system 100 is structured to provide the user with a selection interface 500. According to an example embodiment, the selection interface 500 provides the user with various graphical forms the data for the vehicle fleet 130 may be displayed. As shown in FIG. 5, the selection interface 500 includes the options of selecting a geographic status interface 600, a failure location interface 700, a parameter trend interface 800, and a fault codes interface 900. In other embodiments, the selection interface 500 may provide additional, fewer, or alternative interfaces for the user to select (e.g., based on a purchased subscription, user access permissions/clearance, etc.).

Figure 6:
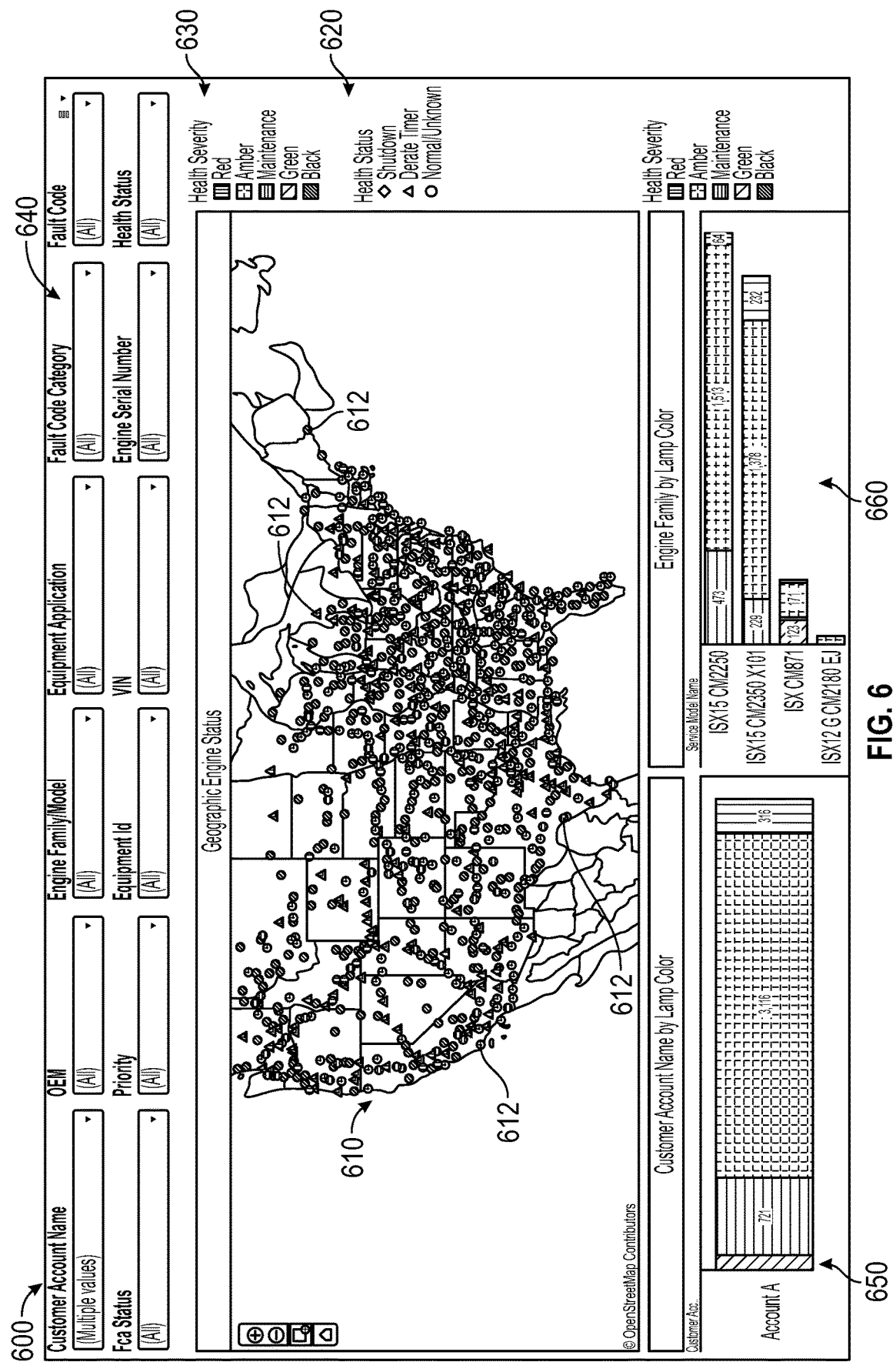
FIG. 6 is an illustration of a graphical user interface for providing data in a geographic status format, according to an example embodiment.

Referring to FIG. 6, the geographic status interface 600 is shown according to an example embodiment. As shown in FIG. 6, the geographic status interface 600 includes map 610 having a plurality of indicators 612 disposed about the map 610. Each of the plurality of indicators 612 represents a vehicle 132 within the vehicle fleet 130 of the user. The indicators 612 may provide an indication to a location of the vehicle 132, a health status of the vehicle 132, and/or a health severity of the vehicle 132. As such, the geographic status interface 600 facilitates the remote tracking of the vehicle(s) 132 of the vehicle fleet 130. The location of a vehicle 132 may allow a user to monitor the vehicle's progress along a route (e.g., by entering a starting point and an ending point for the vehicle, etc.).

According to the example embodiment shown in FIG. 6, the health status of the vehicles 132 are indicated by a shape of the indicators 612. The shape of the indicators 612 are associated with a health status legend 620 (e.g., circular associated with normal operation, triangular associated with derated operation, diamond associated with the vehicle 132 being shutoff, etc.). In other embodiments, the health status of the vehicles 132 are indicated by a color, a fill pattern, a shape, and/or the like of the indicators 612. According to the example embodiment shown in FIG. 6, the health severity of the vehicles 132 are indicated by a color of the indicators 612. The color of the indicators 612 are associated with a health severity legend 630 (e.g., red indicating critical health, green indicating normal health, etc.). In other embodiments, the health severity of the vehicles 132 are indicated by a color, a fill pattern, a shape, and/or the like of the indicators 612. According to an example embodiment, a user may view various data (e.g., the vehicle data 172, the technician data 170, etc.) regarding a vehicle 132 by selecting a corresponding indicator 612. For example, by selecting an indicator 612, data regarding the corresponding vehicle 132, such as engine speed, oil temperature, fault codes, trip duration, trip destination, engine control circuit (ECM) upgrade status (e.g., up-to-date or out-of-date software, etc.), a recommended service/repair, etc., may be displayed.

As shown in FIG. 6, the geographic status interface 600 may further include a plurality of configurable options 640 used to sort, filter, or otherwise alter the data provided by the geographic status interface 600. The configurable options 640 may include fillable forms, drop down menus, and the like. The geographic status interface 600 may also include a fleet overview section 650 and/or a model overview section 660. The fleet overview section 650 may provide an indication to a quantity of vehicles 132 within the vehicle fleet 130 that are operating at various health levels (e.g., corresponding to the health severity legend 630, etc.). While the model overview section 660 may provide an indication to a quantity of various models of the vehicles 132 within the vehicle fleet 130 that are operating at various health levels (e.g., corresponding to the health severity legend 630, etc.).

The geographic status interface 600 may also facilitate providing suggested vehicle servicing locations 120 on the map 610 for vehicles 132 that may need servicing or testing. For example, the data visualization system 100 may overlay various vehicle servicing locations 120 onto the map 610 that are near a vehicle that can provide the recommended service (e.g., have a part needed to fix the vehicle, within a certain distance, etc.). In some embodiments, the geographic status interface 600 provides a "failure resolved" indicator on the map 610. The failure resolved indicator may be linked to a particular indicator 612 showing that the component failure has been remedied. The failure resolved indicator may also provide an indication to a location at which the component failure was addressed and/or fixed (e.g., a vehicle servicing location 120, a location with different external conditions such as altitude, grade, or temperature that may have caused the fault code to clear independently, etc.).

Figure 7:
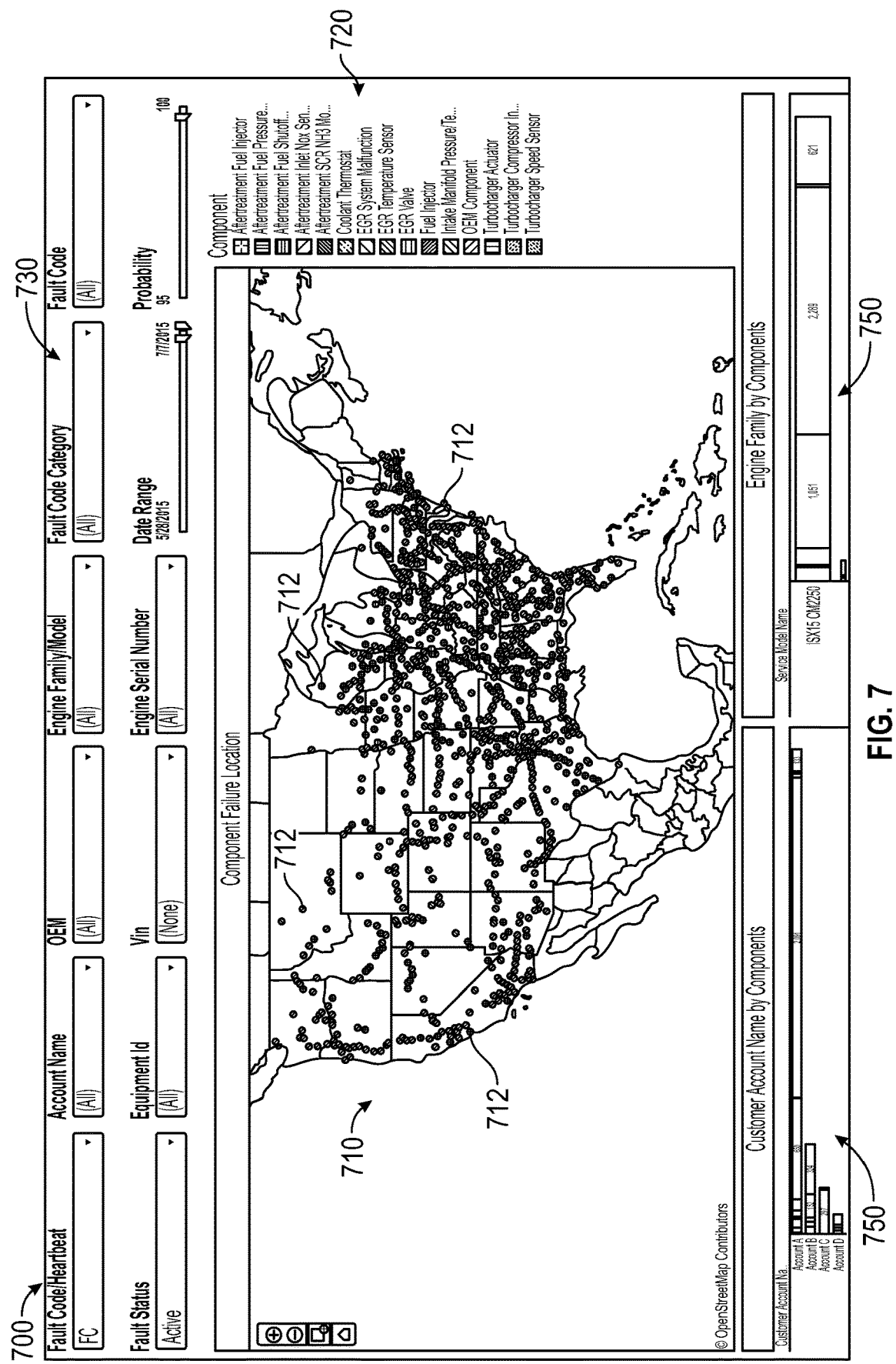
FIG. 7 is an illustration of a graphical user interface for providing a failure location format, according to an example embodiment.

Referring now to FIG. 7, the failure location interface 700 is shown according to an example embodiment. As shown in FIG. 7, the failure location interface 700 includes map 710 having a plurality of indicators 712 disposed about the map 710. Each of the plurality of indicators 712 represents a location at which a component of a vehicle 132 and/or the vehicle 132 within the vehicle fleet 130 experienced a failure (e.g., a fault code, etc.). The indicators 712 may provide an indication to a location of the failure and a type of failure (e.g., which component of the vehicle 132, a criticality of the failure, etc.). As such, the failure location interface 700 facilitates the remote tracking of failure of the vehicle(s) 132 of the vehicle fleet 130. According to an example embodiment, the location of the failure may provide an indication to a root cause of the fault code (e.g., based on external characteristics at the failure location such as grade, altitude, temperature, etc.).

According to the example embodiment shown in FIG. 7, a component of the vehicles 132 that is experiencing a failure is indicated by a color of the indicators 712. The color of the indicators 712 are associated with a component failure legend 720 (e.g., red corresponding to a fuel injector failure, green corresponding to a nitrous oxide (NOx) sensor failure, etc.). In other embodiments, the category of failure is indicated by a color, a fill pattern, a shape, and/or the like of the indicators 712. In some embodiments, the indicators 712 are variously shaped (e.g., circle, square, diamond, triangle, etc.), where each shape indicates a category of failure (e.g., an engine failure, an exhaust aftertreatment system failure, a transmission failure, a coolant system failure, etc.). In other embodiments, the indicators 712 identify individual components that have failed (e.g., a NOx sensor, a catalytic converter, etc.). According to an example embodiment, a user may view various data (e.g., the vehicle data 172, the engine data 174, the technician data 170, etc.) regarding a vehicle 132 or engine system by selecting a corresponding indicator 712. For example, by selecting an indicator 712, data regarding the corresponding vehicle 132 or engine system, such as fault codes, failure location (e.g., GPS coordinates, etc.), loading conditions at failure (e.g., engine torque, speed, etc.), external conditions at failure (e.g., weather, temperature, altitude, grade, etc.), etc., may be displayed.

As shown in FIG. 7, the failure location interface 700 may further include a plurality of configurable options 730 used to sort, filter, or otherwise alter the data provided by the failure location interface 700. The configurable options 730 may include fillable forms, drop down menus, and/or the like. The failure location interface 700 may also include a fleet or engine system overview section 740 and/or a model overview section 750. The fleet or engine system overview section 740 may provide an indication to a quantity of components of the vehicles 132 within a respective vehicle fleet 130 or components that have experienced a failure (e.g., corresponding to the component failure legend 720, etc.). While the model overview section 750 may provide an indication to a quantity of components for each of the various models of the vehicles 132 within the vehicle fleet 130 or engine systems that have experienced a failure.

The failure location interface 700 may also facilitate providing suggested vehicle servicing locations 120 on the map 710 for vehicles 132 based on the component failure. For example, the data visualization system 100 may overlay various vehicle servicing locations 120 onto the map 710 that are near a vehicle that can provide the recommended service (e.g., have a part needed to fix the component, within a certain distance, etc.). The failure location interface 700 may also facilitate providing suggested technician companies on the map 710 to contact for on-site service and/or diagnostics based on the component failure. The failure location interface 700 may also facilitate filtering the data such that only the indicators 712 corresponding to particular component failures that caused vehicle/engine downtime are shown or are highlighted in some manner. In some embodiments, the failure location interface 700 provides a "failure resolved" indicator on the map 710. The failure resolved indicator may be linked to a particular indicator 712 showing that the component failure has been remedied. The failure resolved indicator may also provide an indication to a location at which the component failure was addressed and/or fixed (e.g., a vehicle servicing location 120, a location with different external conditions such as altitude, grade, or temperature that may have caused the fault code to clear independently, etc.).

Figure 8:
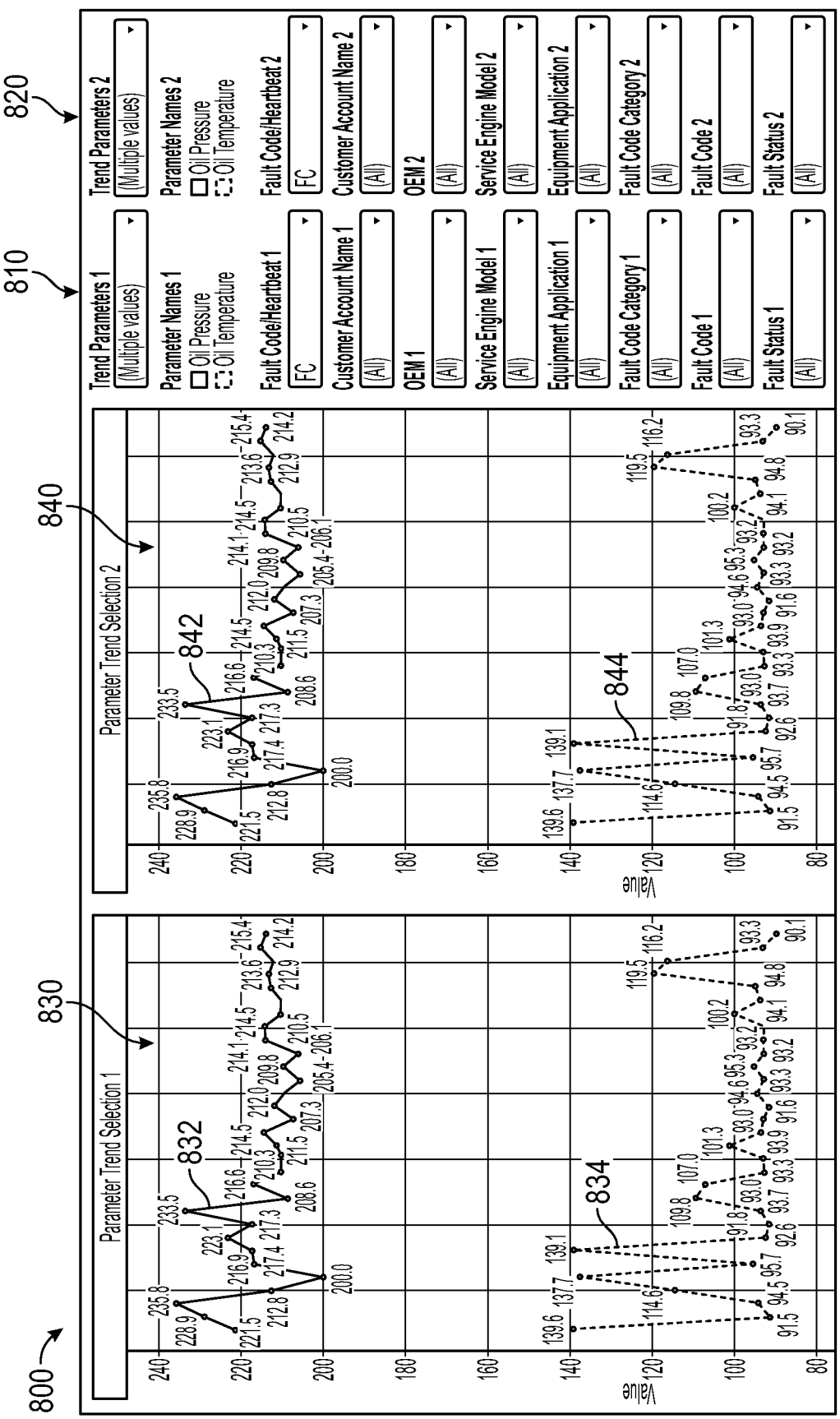
FIG. 8 is an illustration of a graphical user interface for providing a parameter trend format, according to an example embodiment.

Referring to FIG. 8, the parameter trend interface 800 is shown according to an example embodiment. In one embodiment, the parameter trend interface 800 is structured to provide a display of how various factors may influence the performance of one or more components, vehicles, engine systems, and/or populations of vehicles or engine systems. As shown in FIG. 8, the parameter trend interface 800 includes first configurable options 810 with a corresponding first display section 830 and second configurable options 820 with a corresponding second display section 840. In other embodiments, the parameter trend interface 800 displays a different number (e.g., one, three, four, etc.) of corresponding configurable options and display sections (e.g., based on a user input, etc.). The configurable options may include fillable forms, drop down menus, and/or the like.

The configurable options sections 810 and 820 facilitate selecting parameters to display within the display sections 830 and 840, respectively. A user may select to show parameter trends for an individual component, a plurality of the same components, a single vehicle, a plurality of vehicles, an engine system, or a plurality of engine systems within the display sections. A user may also select a number of trends to show in each display section. For example, as shown in FIG. 8, each of the display sections 830 and 840 includes a first trend 832,842 (e.g., an oil pressure trend, etc.) and a second trend 834,844 (e.g., an oil temperature trend, etc.), respectively.

The parameter trend interface 800 may be used to highlight statistically different deviations between two or more populations (e.g., at a point in time, an average over time, at a location, on a particular route, etc.). In some embodiments, the parameter trend interface 800 is structured to auto-select parameters to show a trend indicating an abnormal or different operation of a component, vehicle, engine system, or population thereof compared to another component, vehicle, engine system, or population (e.g., with an average or normal operation of similar components or vehicles, etc.). The parameter trend interface 800 may facilitate comparing trends at a point in time, an average over time, at a location, or along a route. For example, the parameter trend interface 800 may be used to compare two or more vehicles traveling the same route or a single vehicle traveling the same route at two different points in time. The parameter trend interface 800 may also be structured to provide the trends in the form of bar graphs showing average and/or peak values for a certain geographic area (e.g., state, region, etc.) or geographic type (e.g., altitude, grade, etc.).

Figure 9:
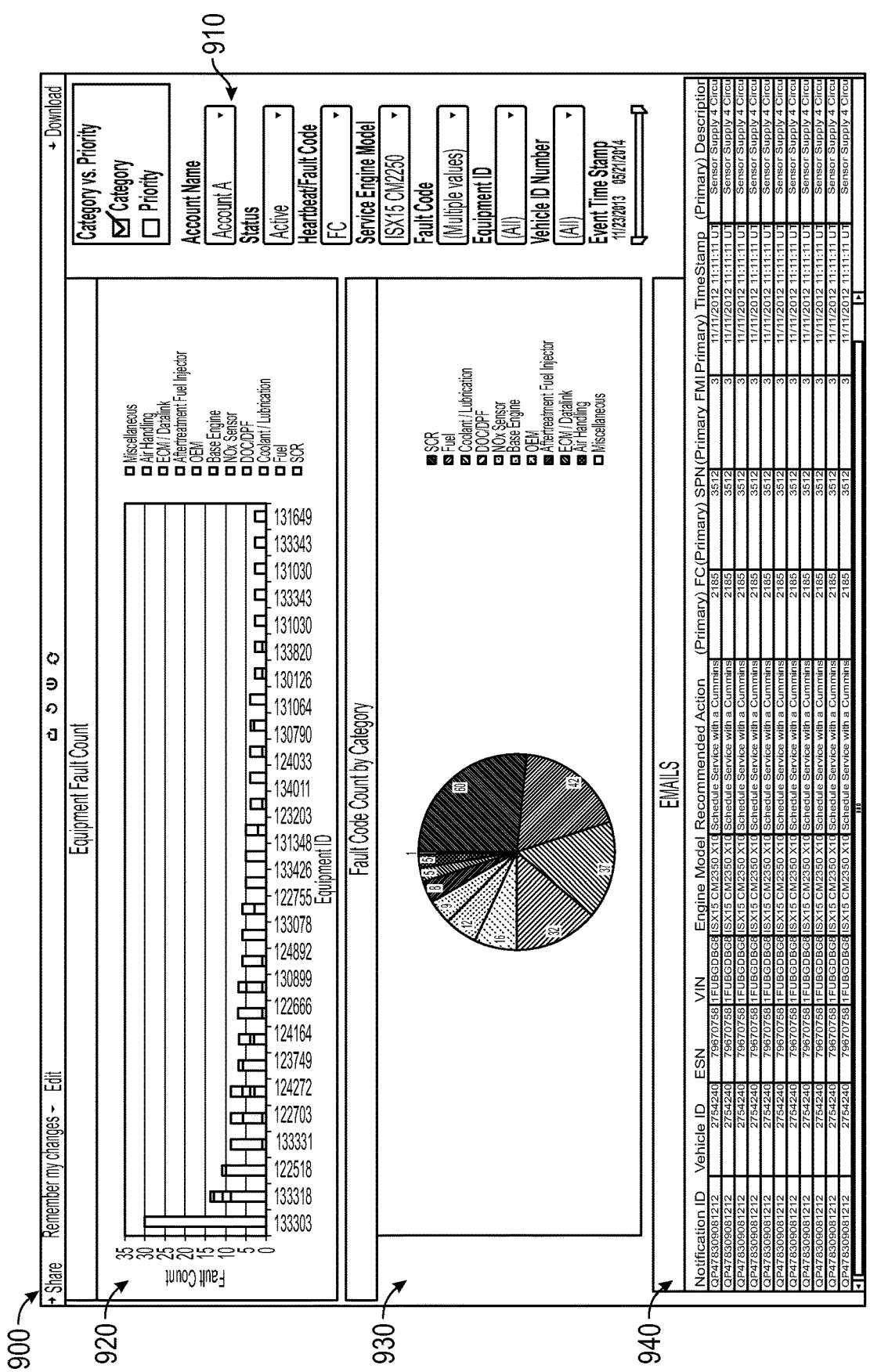
FIG. 9 is an illustration of a graphical user interface for providing a fault code format, according to an example embodiment.

Referring to FIG. 9, the fault code interface 900 is shown according to an example embodiment. As shown in FIG. 9, the fault code interface 900 provides a categorized representation of fault codes for each component, engine system, and/or vehicle 132 within the vehicle fleet 130. According to the example embodiment, all of the fault codes associated with fueling systems may be aggregated into a fueling category, all of the fault codes associated with engines may be aggregated into an engine category, and so on. In other embodiments, the fault codes are categorized by priority such that the relatively high priority fault codes are aggregated into a high priority category, and the lower priority fault codes are aggregated into a lower priority category. As shown in FIG. 9, the fault code interface 900 includes a plurality of configurable options 910 used to sort, filter, or otherwise alter the data provided by the fault code interface 900. For example, the configurable options 910 may be used to switch between a component category display and a priority category display.

As shown in FIG. 9, the fault code interface 900 includes a component fault count section 920, a fault code category section 930, and a notification section 940. The component fault count section 920 is structured to provide an indication to the quantity of fault codes a specific component across a vehicle fleet 130 or engine systems is experiencing (e.g., a number of NOx sensors throwing a fault code, etc.). The fault code category section 930 is structured to provide an indication to a quantity of faults related to a component category (e.g., number of faults related to fueling systems, engines, aftertreatment systems, etc.). The notification section 940 is structured to provide an alert or notification to a user regarding the fault code for a vehicle and/or engine system. In some embodiments, the notification includes a recommended course of action to address the root cause of the fault code. In some embodiments, the notifications are additionally or alternatively sent to a user's email address, texted to a user's cell phone, pushed to a user's mobile device, or the like.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 152 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer (such as via the controller or fleet manager 150 of FIGS. 1-2), partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A non-transitory computer-readable medium storing instructions that, when executed by a processor of a fleet management computing system, cause operations comprising:
receiving (i) vehicle data indicative of a least one operating characteristic of one or more vehicles and (ii) technician data indicative of at least one diagnostic characteristic of the one or more vehicles, wherein the at least one diagnostic characteristic is representative of a technician servicing event;
interpreting the vehicle data and the technician data to facilitate remote monitoring of the one or more vehicles, and to determine a potential root cause for a fault code of a particular vehicle of the one or more vehicles by comparing the vehicle data of the particular vehicle to the vehicle data and the technician data of the one or more vehicles; and
providing a graphical user interface to a display device for depicting the vehicle data and the technician data for the one or more vehicles.

2. The non-transitory computer-readable medium of claim 1, wherein the technician data is indicative of the technician service event for the one or more vehicles.

3. The non-transitory computer-readable medium of claim 1, further comprising receiving a display request for the graphical user interface, wherein the display request includes configurable options for providing the graphical user interface in a desired graphical format.

4. The non-transitory computer-readable medium of claim 1, wherein the graphical user interface facilitates proactive repair of the one or more vehicles based on at least one of the vehicle data or the technician data.

5. The non-transitory computer-readable medium of claim 1, further comprising locating one or more vehicle service locations that have diagnosed or fixed the potential root cause in another vehicle relative to the particular vehicle.

6. The non-transitory computer-readable medium of claim 1, further comprising locating one or more vehicle service locations based on the fault code.

7. The non-transitory computer-readable medium of claim 6, wherein the fault code defines a maximum distance for the location of the one or more vehicle service locations relative to a current location of the particular vehicle.

8. The non-transitory computer-readable medium of claim 1, further comprising modifying at least one of the vehicle data or the technician data for each of the one or more vehicles with a unique modifier.

9. The non-transitory computer-readable medium of claim 1, further comprising receiving a selection of a geographic status format for the graphical user interface that causes the graphical user interface to display the particular vehicle along a route.

10. The non-transitory computer-readable medium of claim 1, further comprising receiving a selection of a failure location format for the graphical user interface that causes the graphical user interface to display a location indicative of the fault code occurring.

11. The non-transitory computer-readable medium of claim 1, further comprising receiving a selection of a parameter trend format for the graphical user interface that causes the graphical user interface to provide a visual comparison of operating characteristics of at least one vehicle to at least one other vehicle.

12. A method, comprising:
receiving, by a processor, (i) vehicle data indicative of at least one operating characteristic of one or more vehicles and (ii) technician data indicative of at least one diagnostic characteristic associated with the one or more vehicles, wherein the at least one diagnostic characteristic is representative of a technician servicing event;
interpreting, by the processor, the vehicle data and the technician data to facilitate remote monitoring of the one or more vehicles;
determining, by the processor, a potential root cause for a fault code of a particular vehicle of the one or more vehicles by comparing data of the particular vehicle to the vehicle data of the one or more other vehicles and the technician data of one or more other vehicles;
receiving, by the processor, a display request for a graphical user interface for formatting the graphical user interface in a desired graphical format based on the vehicle data and the technician data; and providing, by the processor, the graphical user interface in the desired graphical format to a display device.

13. The method of claim 12, wherein the graphical user interface facilitates proactive repair of the one or more vehicles based on at least one of the vehicle data or the technician data.

14. The method of claim 12, further comprising:
determining, by the processor, a recommended course of action to address the potential root cause of the fault code based on the comparison of the vehicle data of the particular vehicle to the technician data of the one or more other vehicles; and providing, by the processor, at least one of the potential root cause for the fault code or the recommended course of action to address the potential root cause of the fault code in the desired graphical format.

15. The method of claim 12, further comprising modifying, by the processor, the technician data for at least one of the one or more vehicles with a unique modifier, wherein the unique modifier is stored within a memory of the processor for the associated vehicle.

16. The method of claim 12, further comprising determining, by the processor, the potential root cause for the fault code of the particular vehicle of the one or more vehicles by comparing data of the particular vehicle to the technician data of one or more other vehicles and to vehicle data indicative of a least one operating characteristic of one or more vehicles.

17. A fleet management computing system coupled to one or more vehicles, the fleet management computing system comprising:
a processor and a memory coupled to the processor, the processor structured to:
receive (i) vehicle data indicative of a least one operating characteristic of the one or more vehicles and (ii) technician data indicative of at least one diagnostic characteristic of the one or more vehicles that is representative of a technician servicing event for at least one of the one or more vehicles at a technician servicing location to facilitate remote monitoring of the one or more vehicles;
determine a potential root cause for a fault code of a particular vehicle of the one or more vehicles by comparing the vehicle data of the particular vehicle to the vehicle data and the technician data of the one or more vehicles; and
cause a display device to display a graphical user interface in response to receiving a display request, wherein the display request includes configurable options for providing the graphical user interface in a desired graphical format for depicting the vehicle data and the technician data of at least one of the one or more vehicles.

18. The fleet management computing system of claim 17, wherein the processor is further structured to determine a recommended course of action to address the potential root cause of the fault code based on the comparison of the vehicle data of the particular vehicle to at least one of the vehicle data and the technician data of the one or more vehicles.

19. The fleet management computing system of claim 17, wherein the processor is further structured to modify at least one of the vehicle data or the technician data for at least one of the one or more vehicles with a unique modifier.

20. The fleet management computing system of claim 17, wherein the desired graphical format includes a failure location format that indicates a location indicative of the fault code occurrence.

* * * * *